US007858229B2

(12) United States Patent
Shin et al.

(10) Patent No.: US 7,858,229 B2
(45) Date of Patent: Dec. 28, 2010

(54) CELL-MODULE CARTRIDGE, CELL-MODULE INCLUDING THE CELL-MODULE CARTRIDGE, AND BATTERY MODULE INCLUDING THE CELL-MODULE

(75) Inventors: Yongshik Shin, Daejeon (KR); Jeeho Kim, Daejeon (KR); Jin Woong Ha, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/442,614

(22) PCT Filed: Sep. 12, 2007

(86) PCT No.: PCT/KR2007/004400

§ 371 (c)(1),
(2), (4) Date: Sep. 25, 2009

(87) PCT Pub. No.: WO2008/038914

PCT Pub. Date: Apr. 3, 2008

(65) Prior Publication Data

US 2010/0136420 A1    Jun. 3, 2010

(30) Foreign Application Priority Data

Sep. 25, 2006    (KR) .................. 10-2006-0092600
Oct. 23, 2006    (KR) .................. 10-2006-0102640

(51) Int. Cl.
*H01M 2/02* (2006.01)
(52) U.S. Cl. .................. 429/179; 429/99; 429/177
(58) Field of Classification Search .................. 429/99, 429/100, 181, 177, 179
See application file for complete search history.

(56) References Cited

U.S. PATENT DOCUMENTS 6,319,631 B1 *    11/2001    Bay et al. .................. 429/178

(Continued)

FOREIGN PATENT DOCUMENTS

KR    20010095528 A    11/2001

(Continued)

OTHER PUBLICATIONS

International Search Report, PCT/KR2007/004400.

*Primary Examiner*—Stephen J Kalafut
*Assistant Examiner*—Zachary Best
(74) *Attorney, Agent, or Firm*—Lerner, David, Littenberg, Krumholz & Mentlik, LLP

(57) ABSTRACT

Disclosed herein are a cell module cartridge including a cartridge body constructed in a rectangular structure in which a plate-shaped secondary battery cell is mounted to the cartridge body, the cartridge body being open at the top thereof, and a top cover mounted to the open top of the cartridge body while the battery cell is mounted to the cartridge body, wherein the cartridge body is provided at the bottom thereof with a plurality of through-holes, the cartridge body is provided at one side of the upper and lower ends of each side wall thereof with a coupling protrusion and a coupling groove, and the cartridge body is provided at the front thereof with a coupling part, to which an additional member for mounting an electrode terminal connecting member is coupled in an assembly fashion, such that the electrode terminal connecting member is stably connected to the corresponding electrode terminal of the corresponding battery cell, and a middle- or large-sized battery module including the same.

14 Claims, 9 Drawing Sheets

U.S. PATENT DOCUMENTS

| | | |
|---|---|---|
| 6,555,264 B1 | 4/2003 | Hamada et al. |
| 2005/0140338 A1 | 6/2005 | Kim et al. |
| 2005/0214597 A1* | 9/2005 | Kim et al. ................ 429/7 |
| 2006/0194101 A1* | 8/2006 | Ha et al. ................ 429/158 |
| 2007/0072066 A1* | 3/2007 | Yoon et al. ................ 429/99 |

FOREIGN PATENT DOCUMENTS

| | | |
|---|---|---|
| KR | 20050036751 A | 4/2005 |
| KR | 20060062006 A | 6/2006 |
| KR | 20060064854 A | 6/2006 |
| WO | 2006/068366 | 6/2006 |
| WO | WO 2006068366 A1 * | 6/2006 |

* cited by examiner

700

CELL-MODULE CARTRIDGE, CELL-MODULE INCLUDING THE CELL-MODULE CARTRIDGE, AND BATTERY MODULE INCLUDING THE CELL-MODULE

FIELD OF THE INVENTION

The present invention relates to a cell module cartridge used for manufacturing a middle- or large-sized battery module and a middle- or large-sized battery module including the same, and, more particularly, to a cell module cartridge including a cartridge body constructed in a rectangular structure corresponding to a plate-shaped secondary battery cell such that the battery cell is mounted to the cartridge body, the cartridge body being open at the top thereof, and a top cover mounted to the open top of the cartridge body while the battery cell is mounted to the cartridge body, wherein the cartridge body is provided at the bottom thereof with a plurality of through-holes, the cartridge body is provided at one side of the upper and lower ends of each side wall thereof with a coupling protrusion and a coupling groove, and the cartridge body is provided at the front thereof with a coupling part, to which an additional member for mounting an electrode terminal connecting member is coupled in an assembly fashion, such that the electrode terminal connecting member is stably connected to the corresponding electrode terminal of the corresponding battery cell, and a middle- or large-sized battery module including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

As a result, kinds of applications using the secondary battery are being increased owing to advantages of the secondary battery, and hereafter the secondary battery is expected to be applied to more applications and products than now.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

The size and weight of the battery module is directly related to the receiving space and output of the corresponding middle- or large-sized device. For this reason, manufacturers are trying to manufacture small-sized, light-weight battery modules. Furthermore, devices, which are subject to a large number of external impacts and vibrations, such as electric bicycles and electric vehicles, require stable electrical connection and physical coupling between components constituting the battery module. In addition, a plurality of battery cells are used to accomplish high output and large capacity, and therefore, the safety of the battery module is regarded as important.

Preferably, the middle- or large-sized battery module is manufactured with small size and small weight, if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, including a sheathing member made of an aluminum laminate sheet, because the weight of the pouch-shaped battery is small, and the manufacturing costs of the pouch-shaped battery are low.

In spite of the above-mentioned advantages, however, the pouch-shaped battery, used as a unit cell of the battery module, has several problems.

First, the pouch-shaped battery is constructed in a structure in which the plate-shaped electrode terminals protrude from the upper end of a battery case, with the result that the electrical connection between the electrode terminals necessary for constructing a battery module is difficult. The electrical connection between the electrode terminals is accomplished generally by coupling the electrode terminals to each other by welding using wires, plates, or bus bars; however, the coupling between the plate-shaped electrode terminals by welding is not easy. Generally, the plate-shaped electrode terminals are partially bent, and the metal plates or the bus bars are welded to the bent portions of the plate-shaped electrode terminals, which requires skilled technique and complicates a process for electrically connecting the electrode terminals to each other. Furthermore, the coupled region may be separated from each other due to external impact, which causes the defect of the pouch-shaped battery.

Secondly, the pouch-shaped battery has a low mechanical strength. For this reason, additional members for maintaining stable coupling and assembly are required when a plurality of batteries are stacked to manufacture a battery module. For example, additional mounting members, such as cartridges, in each of which one or more unit batteries are mounted, are used when the pouch-shaped batteries are stacked to manufacture the battery module. The cartridges are stacked to manufacture the battery module.

Also, when a plurality of battery cells are used to construct a middle- or large-sized battery module or when a plurality of unit modules, each including a predetermined number of battery cells, are used to construct a middle- or large-sized battery module, a large number of members are needed generally to accomplish the mechanical coupling and electrical connection between the battery cells or between the unit modules, and a process for assembling the members is very complicated. Furthermore, a space necessary to couple, weld, or solder the members for the mechanical coupling and electrical connection is required; with the result that the total size of the system is increased.

In addition, when the pouch-shaped battery is applied to a device, such as a vehicle, to which external forces, such as vibrations and impacts, are continuously applied, the output of the device may be unsafe and a short circuit may occur due to the increase of the contact resistance at the electrical connection region of the pouch-shaped battery.

Consequently, there is a high necessity for a technology to apply a mounting member, such as a cartridge, that can be manufactured without difficulty, complement the low mechanical strength of the battery cell, and prevent the occurrence of a short circuit due to an external force and a technology of a coupling method that is capable of accomplishing easy assembly and high structural stability.

SUMMARY OF THE INVENTION

Therefore, the present invention has been made to solve the above problems, and other technical problems that have yet to be resolved.

Specifically, it is an object of the present invention to provide a cell module cartridge that is capable of being easily stacked on another cell module, while complementing the low mechanical strength of battery cells, that is capable of easily accomplishing easy connection between electrode terminals of the battery cells, and that is capable of securing coolant flow channels while the cell module attacked on another cell module.

It is another object of the present invention to provide a middle- or large-sized battery module that can be manufactured by a simple assembly method using cartridges, without using a plurality of members for mechanical coupling and electrical connection, whereby the total manufacturing costs of the battery module is reduced, and that is constructed in a structure in which a possibility of a short circuit in or damage to the battery module is lowered during the assembly or the operation of the battery module.

In accordance with one aspect of the present invention, the above and other objects can be accomplished by the provision of a cell module cartridge used for manufacturing a middle- or large-sized battery module, wherein the cell module cartridge includes a cartridge body constructed in a rectangular structure corresponding to a plate-shaped secondary battery cell ('battery cell') such that the battery cell is mounted to the cartridge body, the cartridge body being open at the top thereof, and a top cover mounted to the open top of the cartridge body while the battery cell is mounted to the cartridge body, and wherein the cartridge body is provided at the bottom thereof with a plurality of through-holes, the cartridge body is provided at one side of the upper end of each side wall thereof with a coupling protrusion, by which the cartridge body is coupled to another cartridge body, while the cartridge body is provided at one side of the lower end of each side wall thereof with a coupling groove corresponding to the coupling protrusion, and the cartridge body is provided at the front thereof with a coupling part, to which an additional member for mounting an electrode terminal connecting member ('mounting insulation member') is coupled in an assembly fashion, such that the electrode terminal connecting member ('member for electrical connection between electrode terminals') is stably connected to the corresponding electrode terminal of the corresponding battery cell.

Consequently, the cell module cartridge of the present invention can be easily stacked on another cell module, while complementing the low mechanical strength of the battery cells, can easily accomplish the connection between electrode terminals of the battery cells, and can secure appropriate coolant flow channels while the cell module stacked on another cell module.

Furthermore, the cell module cartridge according to the present invention can be easily assembled and disassembled by virtue of its structural characteristics. Consequently, when the battery cell in the cell module cartridge gets out of order, the battery cell can be easily replaced with a new one. Even when the service life of the battery cell expires, and therefore, the used battery cell is discarded, it is possible to reuse the cell module cartridge. When the battery cell is defective during the manufacture of a battery pack, it is possible to disassemble the cell module cartridge and replace the defective battery cell with a good battery cell, whereby the defect ratio is greatly reduced.

The plate-shaped battery cell is a secondary battery having a small thickness and a relatively large width and length such that, when the plate-shaped battery cell is stacked on another plate-shaped battery cell, the total size of the stacked battery cells is minimized. In a preferred embodiment, the battery cell is a pouch-shaped battery cell constructed in a structure in which an electrode assembly is mounted in a battery case made of a laminate sheet including a resin layer and a metal layer, and a pair of electrode terminals protrude from one end of the battery case. Specifically, the battery cell may be constructed in a structure in which the electrode assembly is mounted in a pouch-shaped case made of an aluminum laminate sheet. The secondary battery constructed in the above-described structure may be referred to as a pouch-shaped battery cell.

Cathodes, anodes, separators, and an electrolyte, constituting the pouch-shaped battery cell, are well known in the art to which the present invention pertains. For example, a lithium transition metal oxide, such as lithium cobalt oxide, lithium manganese oxide, or lithium nickel oxide, or composite oxide may be used as an active material for the cathodes.

During the charge and discharge of the pouch-shaped battery cell, heat is generated from the pouch-shaped battery cell. Consequently, the through-holes are formed at the cartridge body, as described above, to effectively discharge the heat generated from the battery cell, thereby preventing the overheating of the battery cell. The through-holes may be arranged in a predetermined pattern.

Furthermore, the through-holes may be divided into several through-hole groups, which are spaced a predetermined distance from each other. At least one double-sided adhesive tape may be attached to the remaining region of the cartridge body, excluding the region of the cartridge body where the through-hole groups are located, for fixing the battery cell to the cartridge body. The double-sided adhesive tape serves to further secure the fixation between the battery cell and the cartridge body by virtue of its double-sided adhesive property. Consequently, when external impacts are applied to the cartridge, the movement of the battery cell in the cartridge is restrained by the double-sided adhesive tape, whereby an internal short circuit of the battery cell is prevented.

Preferably, the coupling protrusions and the coupling grooves are formed at opposite side walls of the cartridge such that the stable coupling between the coupling protrusions and the coupling grooves is maintained.

The coupling between the cartridge bodies may be carried out in various manners. Preferably, each cartridge body is provided at the upper end of the rear wall thereof with a coupling concavo-convex part, by which the cartridge body is coupled to another cartridge body, and the cartridge body is provided at the lower end of the rear wall thereof with a coupling groove corresponding to the coupling concavo-convex part, whereby the cartridge bodies are coupled to each other without using additional members. Alternatively, the coupling concavo-convex part may be formed at the lower end of the rear wall of each cartridge body, and the coupling groove may be formed at the upper end of the rear wall of each cartridge body.

Generally, a middle- or large-sized battery module is manufactured by a method of stacking a plurality of battery cells with high integration. In this case, the neighboring battery cells are preferably spaced a predetermined distance from each other so as to effectively remove heat generated during the charge and discharge of the battery cells. Specifically, one or more battery cells, having a low mechanical strength, are mounted in a cartridge, and a plurality of cartridges are stacked to construct a battery module. Consequently, it is necessary to form a coolant channel between the stacked cartridges such that heat accumulating between the stacked battery cells is effectively removed.

In a preferred embodiment, the formation of the coolant channel is possible through a structure in which the cartridge body is provided at the upper end of each side wall thereof with at least one protrusion. Consequently, the coolant channel is formed when another cartridge body is stacked on the cartridge body. The cartridge bodies are spaced apart a predetermined distance from each other by the protrusions to form the coolant channel, along which a coolant flows.

According to the present invention, a plurality of cartridges are stacked in the height direction. Alternatively, the cartridges may be arranged in the lateral direction while being in tight contact with each other.

For example, the cartridge body may be provided at the front thereof with vertical grooves, into which members ('coupling members') for coupling the cartridge body to another cartridge body in the lateral direction are inserted. Consequently, the coupling members, having a length approximately corresponding to the height of the cartridge body, are coupled to the grooves of the cartridge bodies, which are sequentially stacked, in a sliding fashion, such that the respective cartridge bodies are fixed to each other, to manufacture a middle- or large-sized battery module.

The materials for the cartridge body and the top cover are not particularly restricted so long as the cartridge body and the top cover are made of a material exhibiting electrical insulation and having, a predetermined mechanical strength. For example, the cartridge body and the top cover may be made of metal coated with an insulative material, insulative polymer, or a resin composite thereof, but the material for the cartridge body and the top cover is not limited to the above-specified ones.

In the cartridge according to the present invention, the mounting insulation member is preferably constructed approximately in a hexahedral structure having a size approximately corresponding to the front of the cartridge body, the mounting insulation member is provided at the rear thereof with a groove ('cartridge coupling groove'), in which the front end of each cartridge body is inserted, the mounting insulation member is provided at the front thereof with holes ('electrode terminal through-holes'), through which electrode terminals of a battery cell, introduced through the coupling groove, are exposed, and the mounting insulation member is provided at the top thereof, above the electrode terminal through-holes, with a coupling upper end, which is inserted into the electrode terminal connecting member.

The mounting insulation member serves to electrically insulate the electrode terminals of the neighboring battery cells from each other. For this reason, the mounting insulation member is made of an electrically insulative material. A preferred example of the electrically insulative material may be various plastic resins. However, the material for the mounting insulation member is not particularly restricted so long as the mounting insulation member accomplishes the electric insulation.

The mounting insulation member may be coupled to the electrode terminals of the battery cells and the cartridges in various manners. In a preferred embodiment, the battery cell is mounted on the cartridge body, the electrode terminals of the battery cell are bent downward such that the electrode terminals are brought into tight contact with the coupling part formed at the front end of the cartridge body, and the front end of the cartridge body is inserted into the cartridge coupling groove formed at the rear of the mounting insulation member, whereby the coupling between mounting insulation member and the electrode terminals of the battery cells and the cartridges is accomplished. Furthermore, the electrode terminals inserted into the mounting insulation member (the electrode terminals surrounding the front end of the cartridge body) are more securely coupled to the mounting insulation member, when the electrode terminal connecting member is coupled to the mounting insulation member.

Preferably, the mounting insulation member is constructed in a structure in which the electrode terminal connecting member for the electrical connection between the battery cells is easily mounted to the mounting insulation member.

For example, the mounting insulation member may be further provided at the front thereof with a location part, in which the external input and output terminal and the voltage detection terminal of the electrode terminal connecting member are stably located. Also, the mounting insulation member may be provided at the location part thereof, in which the external input and output terminal of the electrode terminal connecting member is stably located, with a coupling depression, and the electrode terminals of the battery cell, exposed outward through the electrode terminal through-holes, may be inserted into the rear groove of the bent coupling part of the electrode terminal connecting member.

Consequently, the middle of the coupling upper end of the mounting insulation member and the electrode terminals, inserted through the mounting insulation member, are tightly coupled to the bent coupling part of the electrode terminal connecting member, whereby the coupling of the electrode terminal connecting member to the mounting insulation member is stably accomplished.

In accordance with another aspect of the present invention, there is provided a cell module including such a cartridge and such a battery cell.

The cell module according to the present invention is compact and stable. Furthermore, the cell module can be easily assembled. Consequently, the use and the handling of the cell module is easy. Preferably, at least one double-sided adhesive tape is attached between the cartridge body and the battery cell, as described above, such that the battery cell can be stably fixed in the cartridge when external vibrations and impacts are frequently applied to the cell module.

In accordance with another aspect of the present invention, there is provided a middle- or large-sized battery module constructed in a structure in which a plurality of such cell modules are stacked.

Generally, a plurality of cell modules, as unit bodies, each of which includes a cartridge and a battery cell, may be combined to manufacture a middle- or large-sized battery module having high output and large capacity. In this case, the coupling between the cell modules, as the unit bodies, may be accomplished in various different manners.

In a preferred embodiment, the middle- or large-sized battery module is manufactured by mounting a battery cell to a cartridge body, while a top cover, constituting each cell module together with the cartridge body, is separated from the cartridge body, stacking a plurality of such cartridge bodies, coupling the top cover to the uppermost cartridge body, and mechanically coupling electrode terminal connecting members to the front of the cartridge stack.

Specifically, the respective battery cells are mounted in cartridges which are open at the tops thereof, not sealed cartridges, the cartridges are stacked, and the open top of the uppermost cartridge is covered by the top cover. Consequently, the number of members used to manufacture the middle- or large-sized battery module is minimized, and therefore, the assembly process is simplified and the manufacturing costs are reduced, whereby it is possible to manufacture a battery module having a more compact structure. Also, the electrode terminal connecting members are coupled to the cartridges in a mechanical assembly fashion, without welding or soldering. Consequently, the manufacturing process is easily performed, and the disassembly of the middle- or large-sized battery module is easily performed.

According to circumstances, an elastic single-sided adhesive tape having a predetermined thickness may be attached to the top of each battery cell. The adhesive tape fills a space defined between a cartridge and another cartridge stacked on the cartridge, and, at the same time, elastically presses the battery cell such that the battery cell is stably mounted in the corresponding cartridge. The single-sided adhesive tape may be an adhesive tape exhibiting elasticity while having a predetermined thickness like a sponge. Alternatively, the single-sided adhesive tape may not be attached to the top of the battery cell, but another cartridge body may be brought into direct contact with the top of the battery cell.

Preferably, the electrode terminal connecting member includes a coupling part ('bent coupling part') bent to form a groove at the rear of the electrode terminal connecting member such that a plate-shaped electrode terminal of the battery cell ('battery cell electrode terminal') is inserted into the groove, an external input and output terminal protruding toward the front of the electrode terminal connecting member while being bent, and a voltage detection terminal protruding toward the front of the electrode terminal connecting member while being bent.

The bent coupling parts and the external input and output terminals of the electrode terminal connecting member are formed in correspondence to the number of battery cells to be electrically connected such that at least two battery cells are electrically connected to each other by the electrode terminal connecting member. Also, the shape of the electrode terminal connecting member may be decided depending upon the positions of the battery cells to be electrically connected. For example, when two battery cells are stacked in the height direction, i.e., the battery cells are not arranged at the same height, the bent coupling parts may be formed at different heights.

In the battery module according to the present invention, in which the battery cells are sequentially stacked, two bent coupling parts are formed such that the height difference between the bent coupling parts is equivalent to the thickness of the battery cell. Consequently, it is possible to connect the electrode terminals between the battery cells in series and/or parallel with each other in a compact structure, without using additional members.

In a preferred embodiment, the external input and output terminals are provided with coupling holes, through which the connection of external circuits to the external input and output terminals is easily accomplished. For example, when the external circuits are wires or cables, the ends of the wires or the cables may be inserted into the corresponding coupling holes, and then a soldering or welding process may be performed. Alternatively, bolts may be inserted into the corresponding coupling holes, whereby the mechanical coupling between the ends of the wires or the cables and the external input and output terminals is accomplished.

The electrode terminal connecting member is not particularly restricted so long as the electrode terminal connecting member is made of a conductive material. For example, a nickel plate having a predetermined thickness may be bent in a predetermined shape to manufacture the electrode terminal connecting member.

In accordance with a further aspect of the present invention, there is provided a high-output, large-capacity battery module assembly including a plurality of middle- or large-sized battery modules.

The middle- or large-sized battery modules may be combined in various manners to construct the battery module assembly. In a preferred embodiment, the battery module assembly is constructed in a structure in which the battery modules are arranged adjacent to each other in the lateral direction, and the battery modules are coupled to each other using coupling members.

The battery modules may be electrically connected to each other in various structures depending upon a desired capacity and output, and therefore, the battery module assembly is applicable to various devices. Consequently, the middle- or large-sized battery module and the battery module assembly according to the present invention are preferably used as a power source for electric vehicles and hybrid electric vehicles, which have a limited installation space and are exposed to frequent vibrations and strong impacts, in consideration of the installation efficiency and the structural stability. More particularly, the battery module assembly according to the present invention is used as a power source for electric vehicles requiring high output and large capacity.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
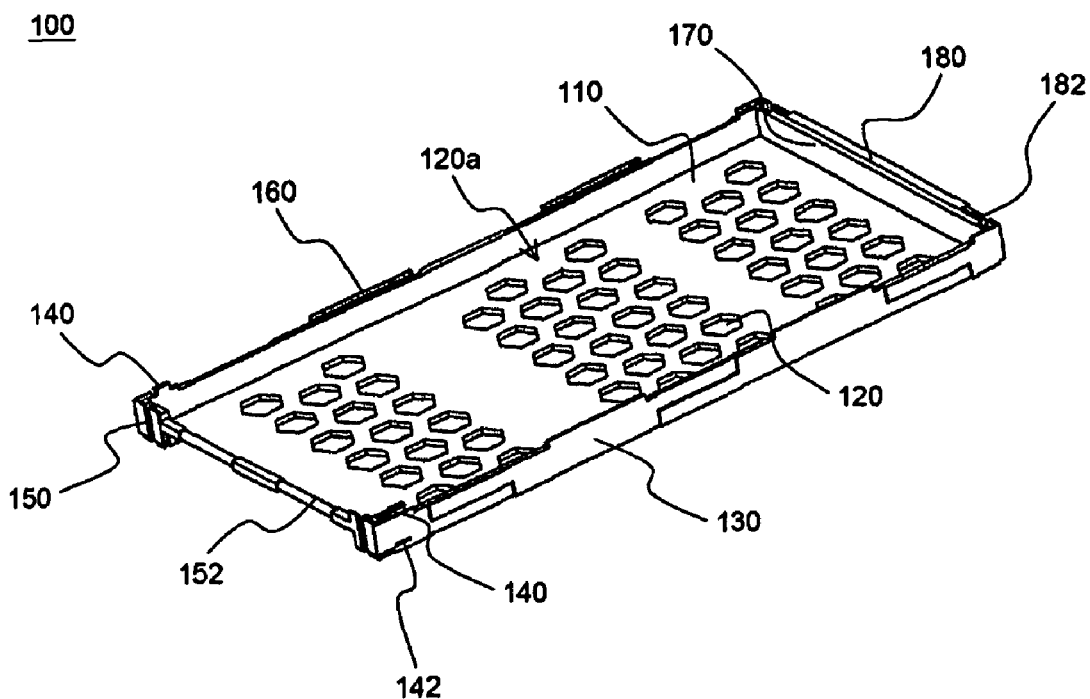
FIGS. 1 and 2 are perspective views respectively illustrating a cartridge body and a top cover constituting a cell module cartridge according to a preferred embodiment of the present invention.
Figure 2:
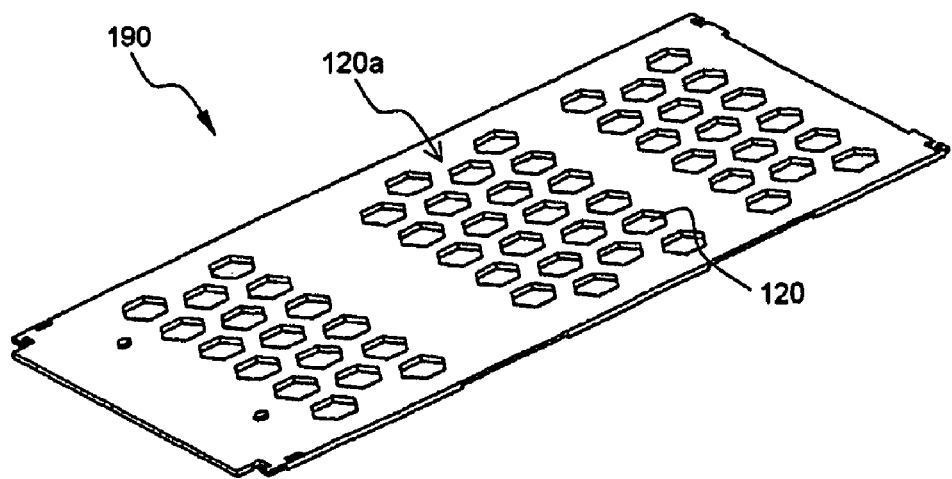
Figure 3:
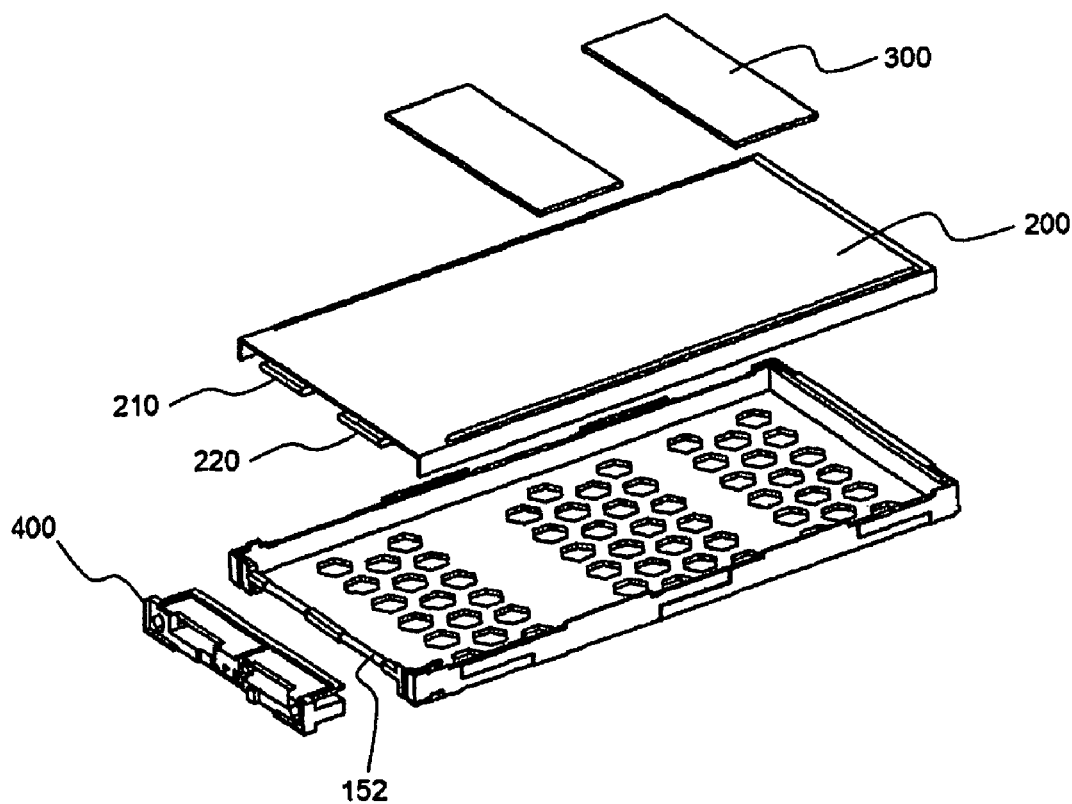
FIGS. 3 and 4 are typical views illustrating a process for mounting a battery cell to the cell module cartridge of FIG. 1.
Figure 4:
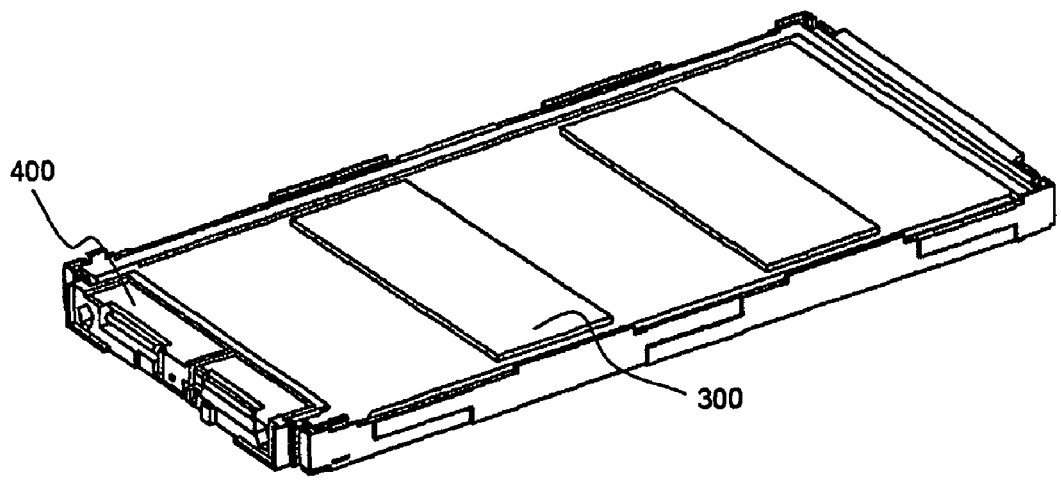

FIGS. 1 and 2 are perspective views respectively illustrating a cartridge body and a top cover constituting a cell module cartridge according to a preferred embodiment of the present invention, and FIGS. 3 and 4 are typical views illustrating a process for mounting a battery cell to the cell module cartridge of FIG. 1.

Referring to these drawings, the cartridge body 100 is constructed in a rectangular structure corresponding to a plate-shaped battery cell 200 (hereinafter, will be shortly referred to as a "battery cell") such that the battery cell 200 is mounted to the cartridge body 100. The cartridge body 100 is open at the top thereof. Also, the cartridge body 100 is provided at the bottom 110 thereof with a plurality of through-holes 120, arranged in a predetermined pattern, for effectively discharging heat generated from the battery cell 200 and thus preventing the overheating of the battery cell 200. The through-holes 120 are divided into several through-hole groups 120a, which are spaced apart from each other by a distance corresponding to each adhesive tape 300, which will be attached to the bottom 110 of the cartridge body 100. The top cover 190 is also provided with a plurality of through-holes 120, which are arranged in a predetermined pattern to divide the through-holes 120 into several through-hole groups 120a.

The cartridge body 100 is provided at one side of the upper end of each side wall 130 thereof with a coupling protrusion 140, by which the cartridge body 100 is another cartridge body (not shown). The cartridge body 100 is provided at one side of the lower end of each side wall 130 thereof with a coupling groove 142 corresponding to the coupling protrusion 140. Also, the cartridge body 100 is provided at the front 150 thereof with a coupling part 152, to which a mounting insulation member 400 is coupled in an assembly fashion.

The cartridge body 100 is provided at the upper ends of the opposite side walls 130 thereof with pluralities of protrusions 160, which form a coolant channel when another cartridge body (not shown) is stacked on the cartridge body 100. The cartridge bodies are spaced apart a predetermined distance from each other by the protrusions 160 to form the coolant channel, along which a coolant flows.

Also, the cartridge body 100 is provided at the upper end of a rear wall 170 thereof with a coupling concavo-convex part 180, by which the cartridge body 100 is coupled to another cartridge body. The cartridge body 100 is provided at the lower end of the rear wall 170 thereof with a coupling groove 182 corresponding to the coupling concavo-convex part 180.

The adhesive tapes 300 may be different depending upon whether the adhesive tapes 300 are attached to the top or bottom of the battery cell 200. For example, when each adhesive tape 300 is attached to the top of the battery cell 200, the adhesive tape 300 may be an elastic single-sided adhesive tape having a predetermined thickness and exhibiting an adhesive property only at one side of each adhesive tape 300. On the other hand, when each adhesive tape 300 is attached to the bottom of the battery cell 200, the adhesive tape 300 may be a double-sided adhesive tape exhibiting an adhesive property at both sides of each adhesive tape 300. The effect resulting from the attachment of the adhesive tapes is the same as in the above description.

Figure 5:
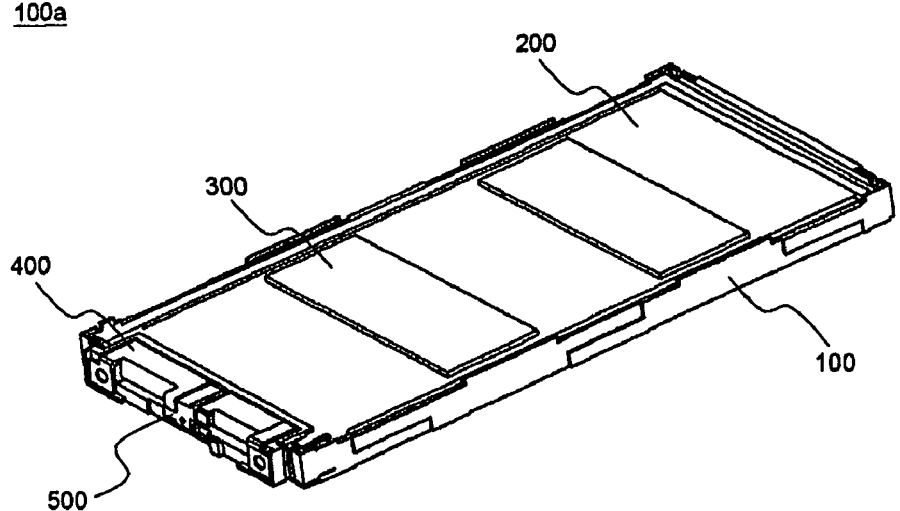
FIG. 5 is a perspective view illustrating a cell module assembled according to a preferred embodiment of the present invention.

FIG. 5 is a perspective view illustrating a cell module assembled according to a preferred embodiment of the present invention.

Hereinafter, a process for assembling the cell module will be described with reference to FIGS. 1 to 4 and FIG. 5. First, the adhesive tapes 300 are attached to the remaining region of the cartridge body 100, excluding the region of the cartridge body 100 where the through-hole groups 120a are located, and the battery cell 200 is mounted to the cartridge body 100. Subsequently, electrode terminals 210 and 220 of the battery cell 200 are bent downward, and are brought into tight contact with the coupling part 152, formed at the front of the cartridge body 100, such that the bent electrode terminals 210 and 220 of the battery cell 200 surround the coupling part 152. Subsequently, the mounting insulation member 400 is assembled to the coupling part 152, with which the electrode terminals 210 and 220 of the battery cell 200 are in tight contact. Finally, an electrode terminal connecting member 410 for electrical connection is coupled to the mounting insulation member 400, the adhesive tapes 300 are attached to the top of the battery cell 200, and the top cover 190 is mounted to the top of the battery cell 200. In this way, the cell module 100a is manufactured.

However, the process for manufacturing the cell module may be changed according to circumstances.

FIGS. 6 to 10 are perspective views illustrating a process for stacking and coupling a plurality of cell module cartridges, one of which is shown in FIGS. 1 to 5, to manufacture a middle- or large-sized battery module.

Figure 6:
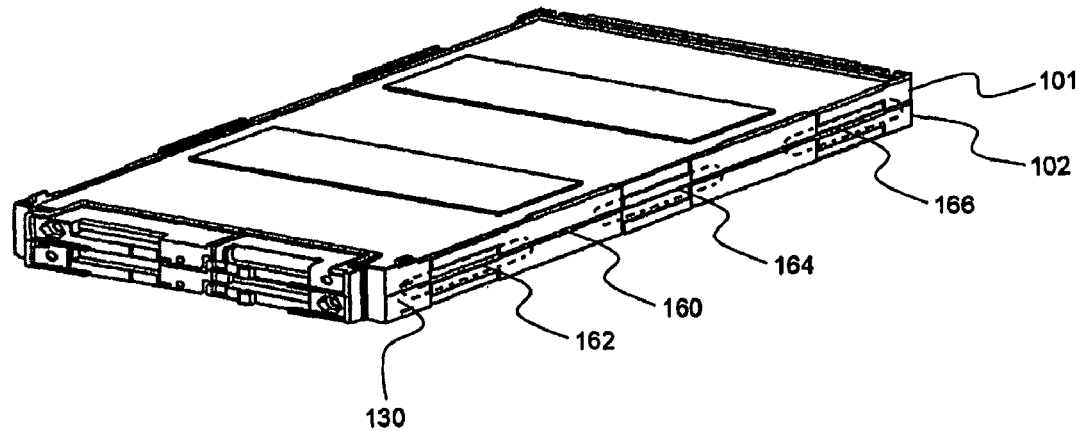
FIGS. 6 to 10 are perspective views illustrating a process for stacking and coupling a plurality of cell module cartridges, one of which is shown in FIGS. 1 to 5, to manufacture a middle- or large-sized battery module.

Referring first to FIG. 6, when a second cartridge body 102 is placed on the top of a first cartridge body 101, in which the battery cell is mounted, the coupling protrusions 140 (see FIG. 1), which are formed at the upper ends of the opposite side walls of the first cartridge body 101, are inserted into the coupling grooves 142 (see FIG. 1), which are formed at the lower ends of the opposite side walls of the second cartridge body 102. Consequently, the stable coupling between the first cartridge body 101 and the second cartridge body 102 is accomplished.

Figure 11:
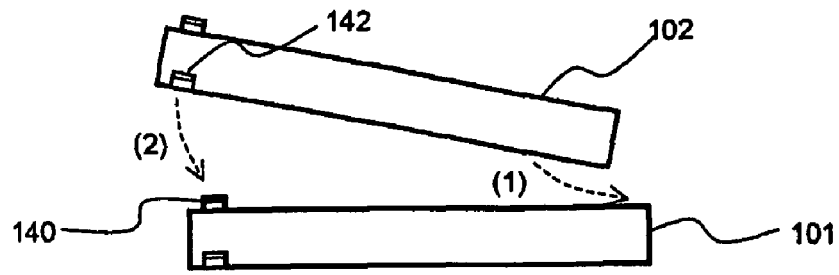
FIG. 11 is a typical view illustrating a process for mounting a second cartridge body to a first cartridge body of FIG. 4.

In this coupling process, as shown in FIG. 11, the rear of the second cartridge body 102 is first coupled to the rear of the first cartridge body 101, and then the front of the second cartridge body 102 is rotated downward such that the coupling protrusions 140 can be inserted into the corresponding coupling grooves 142.

Figure 12:
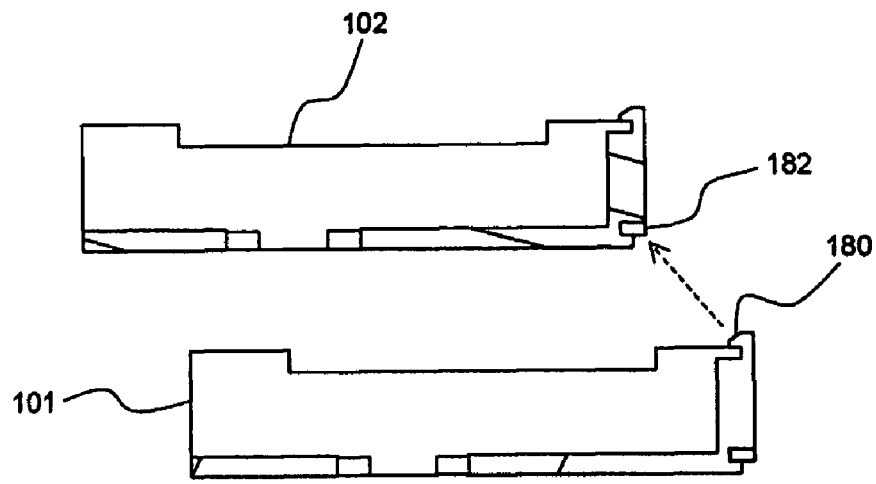
FIG. 12 is an enlarged view illustrating the rear of the cartridge body, on which the process of FIG. 11 is carried out.

Specifically, as shown in FIG. 12, the coupling concavo-convex part 180 is formed at the upper end of the rear wall of the first cartridge body 101, and the coupling groove 182, corresponding to the coupling concavo-convex part 180, are formed at the lower end of the rear wall of the second cartridge body 102. Consequently, when the rear of the second cartridge body 102 is pushed toward the rear of the first cartridge body 101, the coupling concavo-convex part 180 is inserted into the coupling groove 182, whereby the stable coupling between the first cartridge body 101 and the second cartridge body 102 is accomplished.

Referring back to FIG. 6, when the second cartridge body 102 is placed on the top of the first cartridge body 101, the two cartridge bodies 101 and 102 are spaced a predetermined distance from each other by the protrusions 160, formed at the upper ends of the opposite side walls 130 of the first cartridge body 101, to define coolant flow channels 162, 164, and 166, through which heat generated from the battery cell, during the charge and discharge of the battery cell, is effectively cooled.

Figure 7:
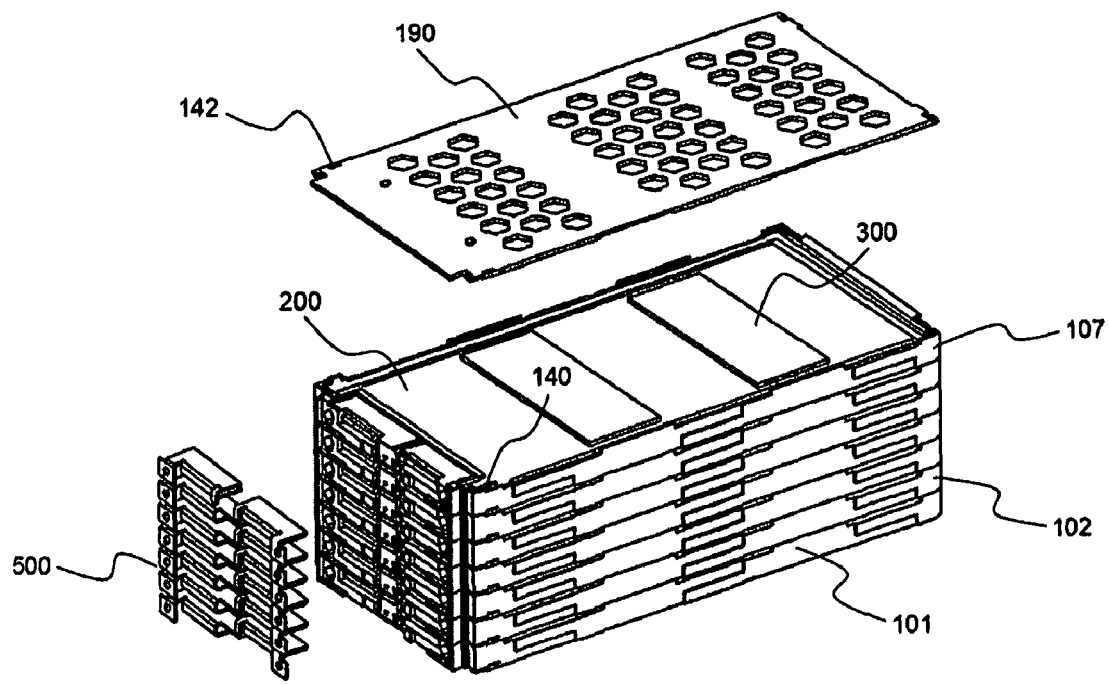

Referring to FIG. 7, a plurality of cartridge bodies 101, 102 . . . , each of which has a battery cell mounted therein in the same manner as shown in FIG. 6, are sequentially stacked, the top cover 190 is mounted to the top of the uppermost cartridge body 107, and predetermined electrode terminal connecting members 500 are coupled to the front of the cartridge stack. The coupling protrusions 140, which are formed at the upper ends of the opposite side walls of the uppermost cartridge body 107, are inserted into coupling grooves 142 formed at the top cover 190, whereby the secure coupling between the uppermost cartridge body 107 and the top cover 190 is accomplished.

Figure 8:
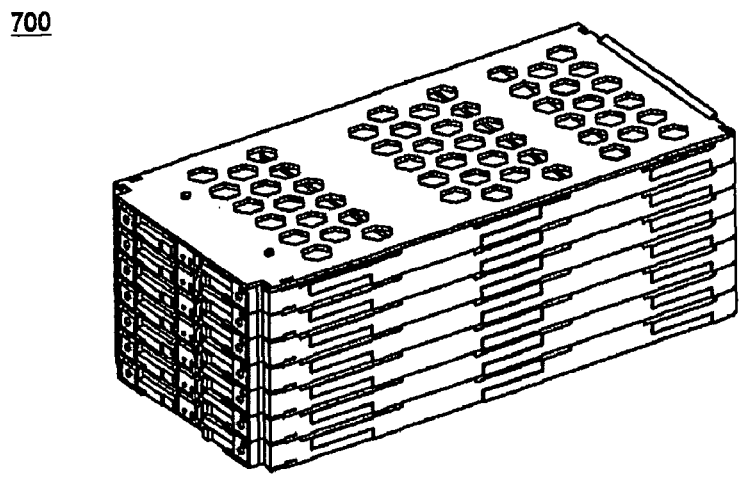
Figure 9:
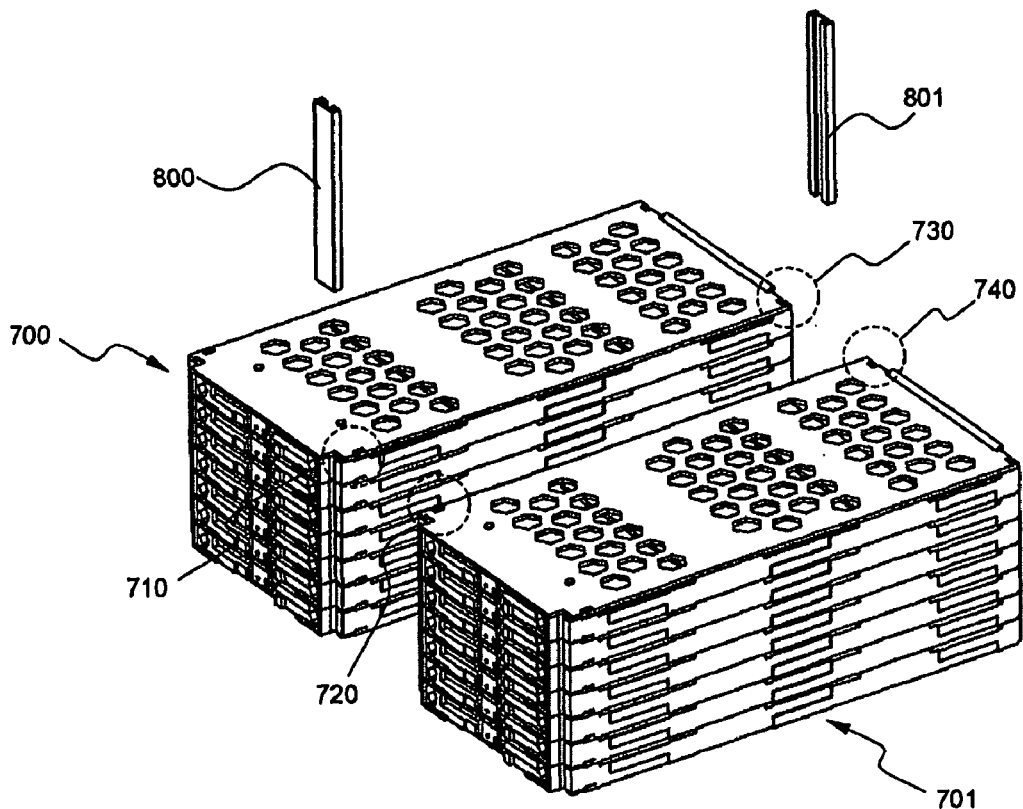
Figure 10:
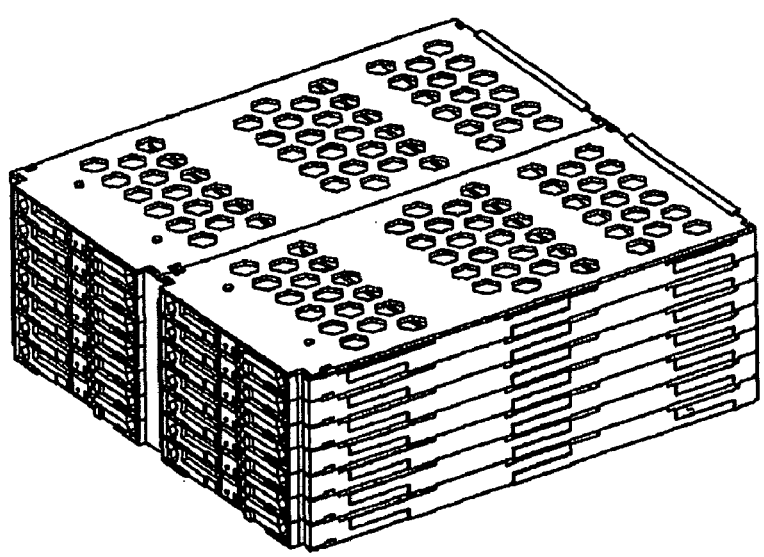

A middle- or large-sized battery module 700, manufactured by the above-described process, is shown in FIG. 8. A plurality of such middle- or large-sized battery modules 700 may be combined to manufacture a large-sized battery module assembly having a desired capacity and output. An example of the large-sized battery module assembly is shown in FIGS. 9 and 10.

Referring to these drawings, the middle- or large-sized battery module 700 is provided at four corners thereof with grooves 710, into which coupling members 800 and 801 for coupling the middle- or large-sized battery module 700 to another battery middle- or large-sized battery module 701 in the lateral direction are inserted.

The coupling members 800 and 801 have a length corresponding to the height of the middle- or large-sized battery modules 700 and 701. The coupling members 800 and 801 are inserted into the connecting grooves 710, 720, 730, and 740 in a sliding fashion, whereby the battery modules 700 and 701 are coupled to each other, and therefore, a large-sized battery module assembly 900 having a large electric capacity or output as shown in FIG. 10 is manufactured.

Figure 13:
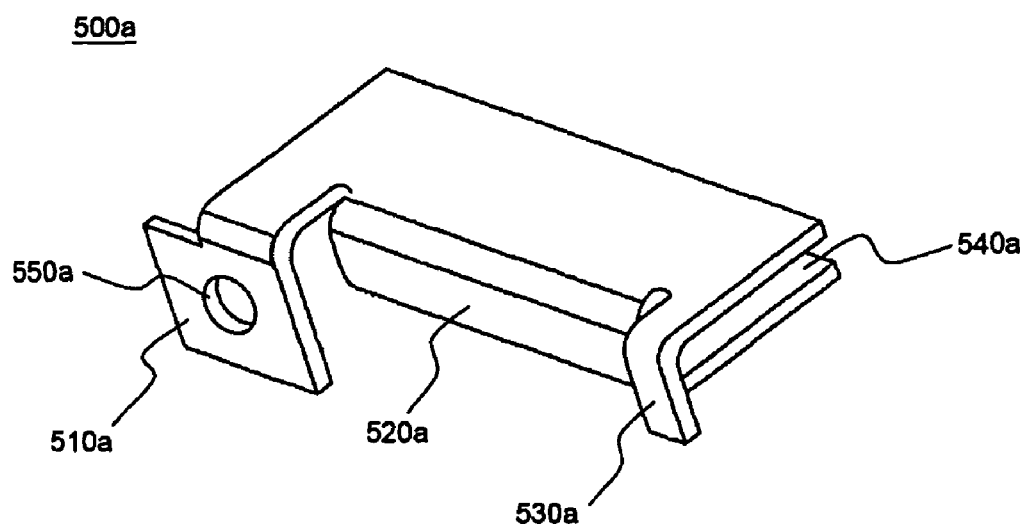
FIGS. 13 to 15 are typical views illustrating various electrode terminal connecting members according to preferred embodiments of the present invention, which are used to manufacture a battery module according to the present invention.
Figure 14:
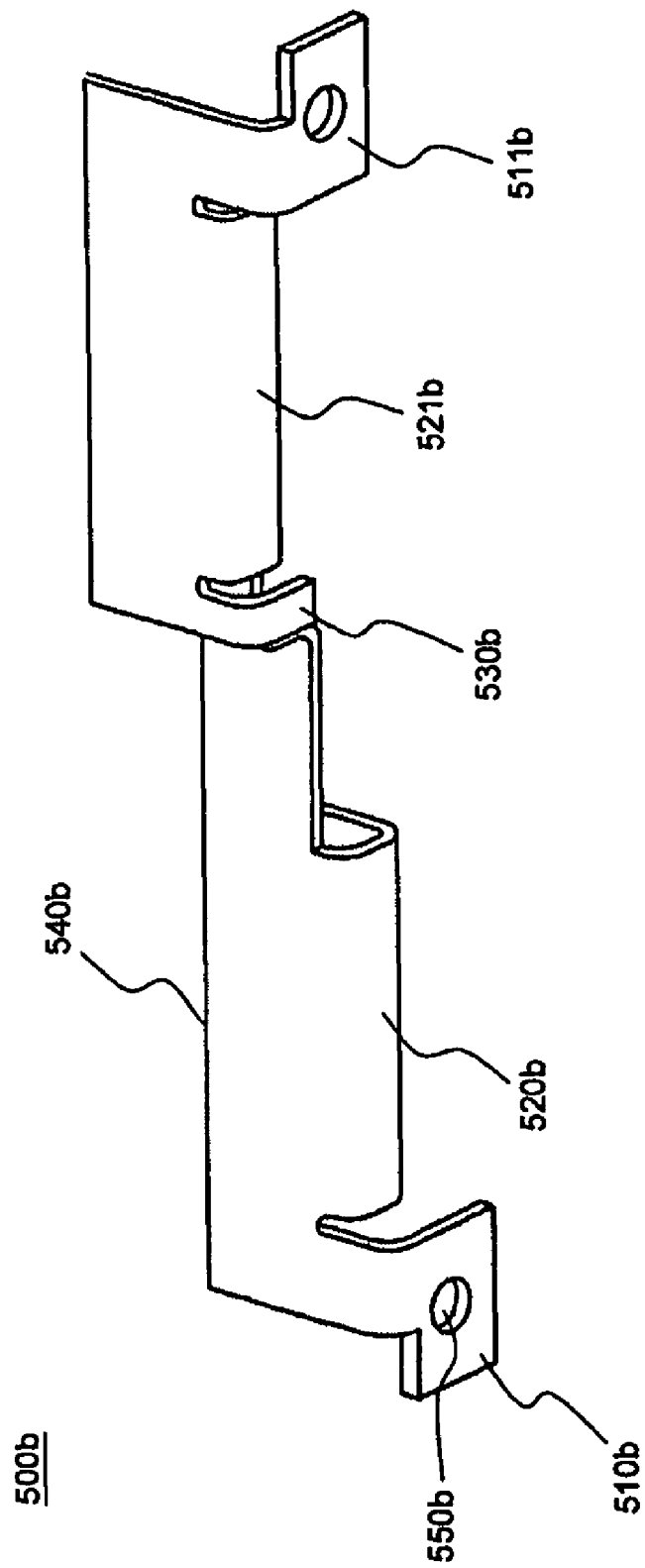
Figure 15:
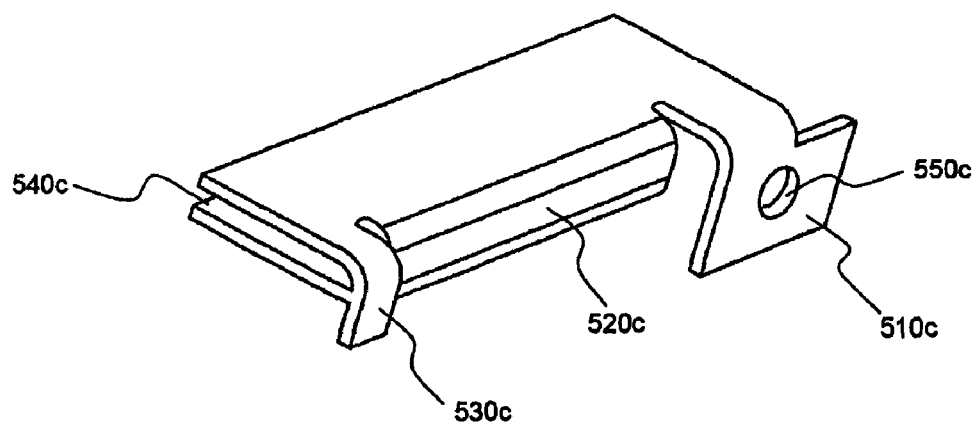
Figure 16:
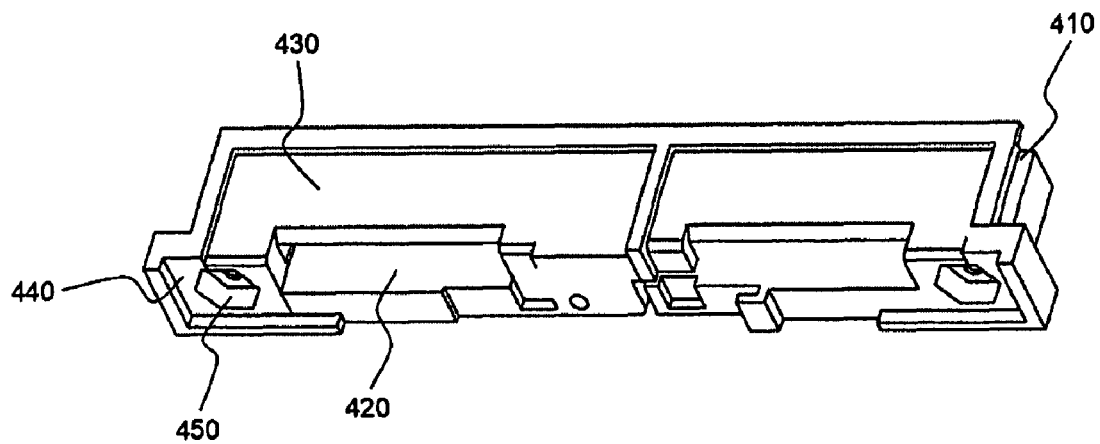
FIG. 16 is a typical view illustrating a mounting insulation member, to which the electrode terminal connecting members are mounted during the construction of a battery module.

FIGS. 13 to 15 are typical views illustrating various electrode terminal connecting members according to preferred embodiments of the present invention, which are used to manufacture a battery module according to the present invention, and FIG. 16 is a typical view illustrating a mounting insulation member, to which the electrode terminal connecting members are mounted during the construction of the battery module.

For easy understanding, the electrode terminal connecting member 500a shown in FIG. 13 is referred to as an "A-type connecting member," the electrode terminal connecting member 500b shown in FIG. 14 is referred to as a "B-type connecting member," and the electrode terminal connecting member 500c shown in FIG. 15 is referred to as a "C-type connecting member."

Referring to these drawings, the electrode terminal connecting member 500a includes a bent coupling part 520a, which is bent to form a groove 540a at the rear of the electrode terminal connecting member 500a such that an electrode terminal (for example, a cathode terminal) of a battery cell (not shown) is inserted into the groove 540a, an external input and output terminal 510a protruding toward the front of the electrode terminal connecting member 500a while being bent, and a voltage detection terminal 530a protruding toward the front of the electrode terminal connecting member 500a while being bent. The electrode terminal connecting member 500b includes a bent coupling part 520b, which is bent to form a groove 540b at the rear of the electrode terminal connecting member 500b such that an electrode terminal (for example, a cathode terminal) of a battery cell (not shown) is inserted into the groove 540b, an external input and output terminal 510b protruding toward the front of the electrode terminal connecting member 500b while being bent, and a voltage detection terminal 530b protruding toward the front of the electrode terminal connecting member 500b while being bent. The electrode terminal connecting member 500c includes a bent coupling part 520c, which is bent to form a groove 540c at the rear of the electrode terminal connecting member 500c such that an electrode terminal (for example, a cathode terminal) of a battery cell (not shown) is inserted into the groove 540c, an external input and output terminal 510c protruding toward the front of the electrode terminal connecting member 500c while being bent, and a voltage detection terminal 530c protruding toward the front of the electrode terminal connecting member 500c while being bent.

The external input and output terminal 510a and the voltage detection terminal 330a are bent in parallel to the front of the electrode terminal connecting member 500a. The external input and output terminal 510b and the voltage detection terminal 530b are bent in parallel to the front of the electrode terminal connecting member 500b. The external input and output terminal 510c and the voltage detection terminal 530c are bent in parallel to the front of the electrode terminal connecting member 500c.

The bent coupling parts 520a, 520b, and 520c and the external input and output terminals 510a, 510b, and 510c are formed in correspondence to the number of battery cells to be electrically connected. For example, the electrode terminal connecting member 500b shown in FIG. 14 includes two bent coupling parts 520b and 521b and two external input and output terminals 510b and 511b, by which electrode terminals of two battery cells are connected in parallel or in series to each other. Also, the bent coupling parts 520b and 521b are formed such that the height difference between the bent coupling parts 520b and 521b is equivalent approximately to the thickness of the battery cell. The external input and output terminals 510b and 511b are located at opposite ends of the electrode terminal connecting member 500b. The voltage detection terminal 530b is located approximately at the middle of the electrode terminal connecting member 500b.

The external input and output terminals 510a, 510b, and 510c are provided with coupling holes 550a, 550b, and 550c, respectively, through which secure electrical connection using wires is easily accomplished.

Referring to FIG. 16, the mounting insulation member 400 is constructed approximately in a rectangular parallelepiped structure. At the rear of the mounting insulation member 400 is formed a cartridge coupling groove 410, in which the front end of a cartridge body (not shown) is inserted. At the front of the mounting insulation member 400 are formed a pair of electrode terminal through-holes 420, through which electrode terminals of a battery cell, introduced through the coupling groove 410, are exposed.

At the top of the mounting insulation member 400, above the electrode terminal through-holes 420, is formed a coupling upper end 430, which is inserted into the rear groove 540a, 540b, 540c of the bent coupling part 520a, 520b, 520c of the electrode terminal connecting member 500a, 500b, 500c (see FIGS. 13 to 15).

At the front of the mounting insulation member 400 is also formed a location part 540, in which the external input and output terminal 510a, 510b, 510c and the voltage detection terminal 530a, 530b, 530c of the electrode terminal connecting member 500a, 500b, 500c (see FIGS. 13 to 15) are stably located. Also, a coupling depression 450 is formed at a position corresponding to the coupling hole 550a, 550b, 550c of the external input and output terminal 510a, 510b, 510c while the electrode terminal connecting member 500a, 500b, 500c is mounted to the mounting insulation member 400.

Figure 17:
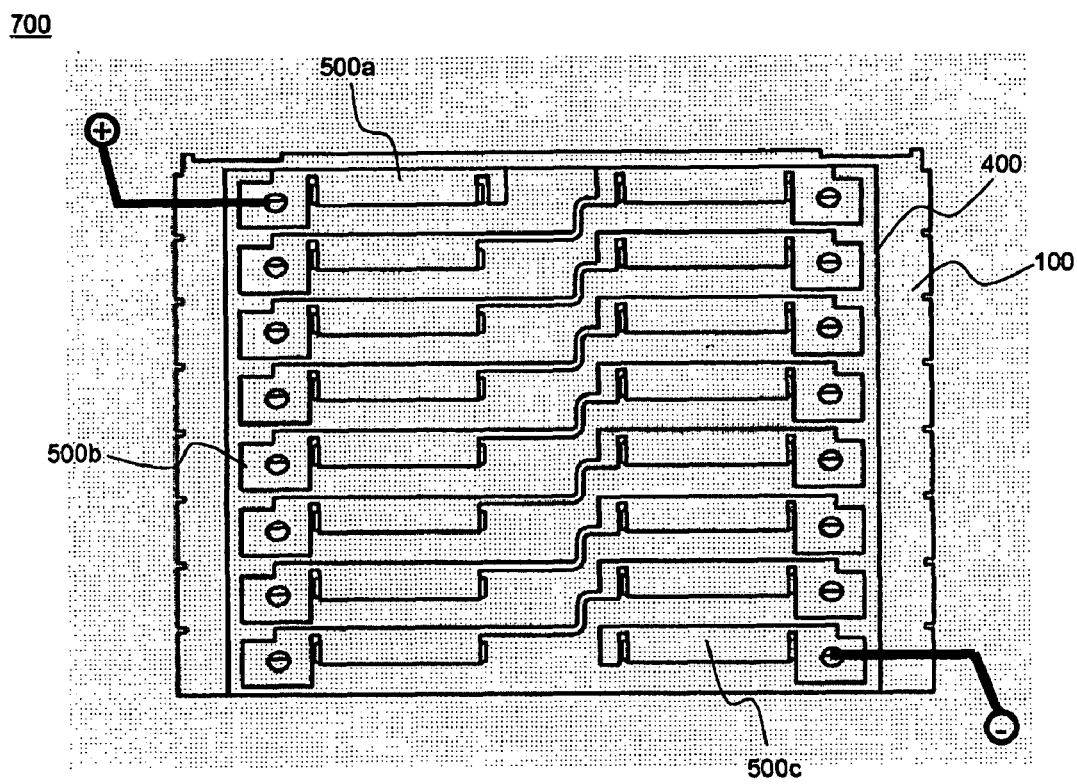
FIG. 17 is a typical view illustrating the structure of the middle- or large-sized battery module of FIG. 8, which is constructed such that battery cells are connected in series with each other using the electrode terminal connecting members.

FIG. 17 is a typical view illustrating the structure of the middle- or large-sized battery module manufactured in FIG.

8, which are constructed in a structure in which battery cells are connected in series with each other using the electrode terminal connecting members.

Referring to FIG. 17, the middle- or large-sized battery module 700 includes a total of eight battery cells, to each of which a mounting insulation member 400 is coupled while each battery cell is mounted in a cartridge body 100. Specifically, the middle- or large-sized battery module 500 is constructed in a structure in which an A-type connecting member 500a is coupled to a cathode terminal of the battery cell located at the left upper end of the battery module 700, a C-type connecting member 500c is coupled to an anode terminal located at the right lower end of the battery cell of the battery module 700, and B-type connecting members 500b are coupled to the remaining electrode terminals, such that the eight battery cells are connected in series with each other (8S).

However, the battery cells, constituting the battery module, may be connected in parallel and/or series with each other in various structures in addition to the electrical connection structure shown in FIG. 17.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the cell module cartridge according to the present invention restrains the movement of the battery cell, when the battery is dropped or external impacts are applied to the battery, thereby preventing the occurrence of a short circuit in the battery and providing further improved safety of the battery.

Furthermore, the cell module cartridge according to the present invention accomplishing easy connection between the electrode terminals while complementing the mechanical strength of the pouch-shaped secondary battery, which is a defect of the pouch-shaped secondary battery. In addition, it is possible to combine the cell module cartridges in various structures depending a desired output and capacity of a battery module. Consequently, a middle- or large-sized battery module, assembled using the cell module cartridge according to the present invention, is preferably used as a power source for electric bicycles (E-bike), electric motorcycles, electric vehicles, or hybrid electric vehicles.

What is claimed is:

1. A cell module cartridge used for manufacturing a middle- or large-sized battery module, wherein the cell module cartridge comprises:
   a cartridge body constructed in a rectangular structure corresponding to a plate-shaped secondary battery cell such that the battery cell is mounted to the cartridge body, the cartridge body having an open top portion, a bottom portion, a front portion, a rear wall, and two side walls extending from the bottom portion toward the open top portion and between the front portion and the rear wall, and
   a top cover mounted to the open top portion of the cartridge body while the battery cell is mounted to the cartridge body, and
   wherein the cartridge body is provided at the bottom portion with a plurality of through-holes,
   wherein the cartridge body is provided at one side of a top end of each side wall with a coupling protrusion, by which the cartridge body is coupled to another cartridge body, while the cartridge body is provided at one side of a bottom end of each side wall with a coupling groove corresponding to the coupling protrusion,
   wherein the cartridge body is provided at the front portion with a coupling part, to which a mounting insulation member, which is an additional member for mounting an electrode terminal connecting member, is coupled in an assembly fashion, such that the electrode terminal connecting member, which is a member for electrical connection between electrode terminals, is stably connected to a corresponding electrode terminal of the corresponding battery cell,
   wherein the mounting insulation member is provided at a rear end thereof with a cartridge coupling groove, in which the coupling part of the cartridge body is inserted, and
   wherein the mounting insulation member is provided at a front end thereof with electrode terminal through-holes, through which electrode terminals of the battery cell, introduced through the coupling groove, are exposed.

2. The cell module cartridge according to claim 1, wherein the battery cell is a pouch-shaped battery cell constructed in a structure in which an electrode assembly is mounted in a battery case made of a laminate sheet including a resin layer and a metal layer.

3. The cell module cartridge according to claim 1, wherein the plurality of through-holes is divided into several through-hole groups spaced from each other.

4. The cell module cartridge according to claim 1, wherein the coupling protrusions and the coupling grooves are formed at opposite side walls of the cartridge.

5. The cell module cartridge according to claim 1, wherein the cartridge body is provided at a top end of the rear wall with a coupling concavo-convex part, by which the cartridge body is coupled to another cartridge body, and the cartridge body is provided at a bottom end of the rear wall with a coupling groove corresponding to the coupling concavo-convex part.

6. The cell module cartridge according to claim 1, wherein the cartridge body is provided at the top end of each side wall with at least one protrusion, which forms a coolant channel when another cartridge body is stacked on the cartridge body.

7. The cell module cartridge according to claim 1, wherein the cartridge body is provided at the front portion with vertical grooves extending in a vertical direction between the open top portion and the bottom portion, into which coupling members for coupling the cartridge body to another cartridge body in the lateral direction perpendicular to the vertical direction are inserted.

8. The cell module cartridge according to claim 1, wherein the cartridge body and the top cover are made of an insulative material or an insulative surface-coated material.

9. The cell module cartridge according to claim 1, wherein
   the mounting insulation member is constructed approximately in a hexahedral structure having a size approximately corresponding to the front portion of the cartridge body,
   and
   the mounting insulation member is provided at a top end thereof, above the electrode terminal through-holes, with a coupling upper end, which is inserted into the electrode terminal connecting member.

10. A cell module comprising a cartridge according to claim 1 and a battery cell.

11. The cell module according to claim 10, wherein at least one double-sided adhesive tape is attached between the cartridge body and the battery cell.

12. A middle- or large-sized battery module constructed in a structure in which a plurality of cell modules according to claim 10 are stacked.

13. The battery module according to claim 12, wherein the battery module is manufactured by mounting a battery cell to a cartridge body, while a top cover, constituting each cell module together with the cartridge body, is separated from the cartridge body, stacking the plurality of the cartridge bodies, coupling the top cover to the topmost cartridge body, and mechanically coupling electrode terminal connecting members to the front portions of the stacked cartridge bodies.

14. The battery module according to claim 13, wherein an elastic single-sided adhesive tape having a predetermined thickness is attached to a top of each battery cell, constituting the stacked cartridge bodies.

* * * * *